United States Patent [19]

Erhardt

[11] Patent Number: 4,739,587

[45] Date of Patent: Apr. 26, 1988

[54] ROLLING DRIVE FOR A GEAR-GRINDING MACHINE

[75] Inventor: Manfred Erhardt, Puchheim, Fed. Rep. of Germany

[73] Assignee: Carl Hurth Maschinen- und Zahnradfabrick GmbH & Co., Munich, Fed. Rep. of Germany

[21] Appl. No.: 859,119

[22] Filed: May 2, 1986

[30] Foreign Application Priority Data

May 3, 1985 [DE] Fed. Rep. of Germany ....... 3515913

[51] Int. Cl.⁴ ............................................. B24B 17/00
[52] U.S. Cl. .................................................. 51/123 G
[58] Field of Search .............. 51/123 G, 123 R, 52 R, 51/95 R, 95 GH, 105 GG, 287, 124 R, 94 R

[56] References Cited

U.S. PATENT DOCUMENTS

| 3,263,372 | 8/1966 | Erhardt ............................ | 51/123 G |
| 4,045,916 | 9/1977 | Seitz .................................. | 51/123 G |
| 4,045,917 | 9/1977 | Loos et al. ......................... | 51/123 |

FOREIGN PATENT DOCUMENTS 0721899 5/1942 Fed. Rep. of Germany .
2459033 12/1974 Fed. Rep. of Germany .
2701204 7/1978 Fed. Rep. of Germany ... 51/123 G Primary Examiner—Frederick R. Schmidt
Assistant Examiner—Robert A. Rose
Attorney, Agent, or Firm—Flynn, Thiel, Boutell & Tanis

[57] ABSTRACT

A rolling device for a gear-grinding machine in which the rotation portion of the rolling movement is effected by roll bands secured at one end to a roll-band carriage which is movable transversely with respect to the workpiece axis and at the other end to a roll cam. The roll cam is oriented coaxially with the workpiece on a roll-cam carriage which is movably driven back and forth transversely to the workpiece axis. The roll-cam carriage and the roll-band carriage are hingedly connected to a rocker arm which is hingedly supported at a pole point which can be adjusted on the machine frame corresponding with the workpiece diameter, and transfers the back and forth movement of the roll-cam carriage onto the roll-band carriage. The pole point of the rocker arm lies on a straight line which is defined by the hinge points of the two carriages, preferably between the two hinge points. That is, the diameter of the roll cam is then larger than the pitch circle of the workpiece which is to be machined.

8 Claims, 2 Drawing Sheets

ROLLING DRIVE FOR A GEAR-GRINDING MACHINE

FIELD OF THE INVENTION

The invention relates to a rolling drive of a gear-grinding machine for use in machining of tooth flanks on straight or helically toothed spur gears.

BACKGROUND OF THE INVENTION

In a known design of a rolling drive (German Pat. No. 721 899), the driven carriage is the roll-band carriage, which transfers its movement through the roll bands on the one side and a rocker arm on the other side onto the roll-cam carriage which carries the workpiece spindle. The roll-cam carriage must in such machines cover a relatively large path during its back and forth movement in order to communicate to the workpiece the necessary rolling motion. Caused by the drive arrangement in the known design, the roll-band carriage must cover yet a larger path, which has unfavorable effects on the rolling behavior of the roll bands and thus on the rolling motion of the roll cam and thus on the workpiece with the consequence that the grinding result is not satisfactory.

The roll cam which is used in the known device does permit, due to the slide ring which is guided in the rocker arm, the working of gears with a pitch circle diameter which is substantially larger compared with the roll cam, whereas the working of gears with a pitch circle diameter which is smaller compared with the roll cam is only possibly limited, because the slide rings prevent the adjusting of a randomly small distance between the pole point of the rocker arm and the hinge point of the rocker arm on the roll-cam carriage. If, however, gears with a pitch circle diameter which is larger compared with the roll-cam diameter are primarily worked, then errors which are created from inexactnesses in the rolling motion of the roll cam are transferred corresponding with the diameter ratio enlarged onto the workpiece.

The known device has therefore not found a significant acceptance in practice, even if the principle, to be able to work with a roll cam of specific diameter gears with substantially random pitch circle diameters, permits a quick and primarily inexpensive changing of the gear-grinding machine from one pitch circle diameter to another pitch circle diameter. In other known gear-grinding machines, a separate roll cam with precisely the same diameter must be provided for each pitch circle diameter. This means nothing different in practice than that for almost each workpiece design, a special roll cam must be manufactured or obtained, since different workpieces, according to experience, only very rarely have exactly the same pitch circle diameter. The purchasing and storage expenses for the many small roll cams are significant.

The basic purpose of the invention, therefore, consists in further developing the rolling drive of the abovementioned type so that the mentioned disadvantages are avoided, that is, that a roll cam of specific diameter is sufficient in order to work gears within a range of different pitch circle diameters, which range is as large as possible, without causing the utilized rollcam diameter to generate negative effects on the machining quality, in particular on the concentricity exactness and the flank profile.

The purpose is inventively attained by providing the rolling drive, which has the characteristic of (1) the driven carriage being the roll-cam carriage and wherein the pole point (A) ofth rocker arm and the hinge point (C) on the roll-band carriage lie on the same side of the hinge point (B) on the roll-cam carriage, such that between the distance AB of the pole point (A) of the rocker arm from the hinge point (B) of the roll-cam carriage on the rocker arm and the distance BC of the hinge point (B) from the hinge point (C) of the roll-band carriage on the rocker arm, there exists the relationship AB=BC or (2) the driven carriage being the roll-cam carriage and wherein the pole point (A) of the rocker arm and the pole point (C) on the roll-band carriage lie on the same side of the hinge point (B) on the roll-cam carriage, whereby the distance AB between the pole point (A) of the rocker arm and the hinge point (B) of the roll-cam carriage on the rocker arm is smaller than or at most the same size as the distance BC between the hinge points (B,C) of the roll-cam carriage and of the roll-band carriage on the rocker arm. If the pole point of the rocker arm and the hinge point of the two carriages are arranged according (1) above, the gears can be worked with almost any kind of a pitch circle diameter, than those with a larger, same or smaller diameter than the one of the roll-cam diameter. Whereas, if the pole point of the rocker arm and the hinge points of the two carriages are arranged according to (2) above, then only those gears can be worked, the pitch circle diameters of which are at most only as large as the roll-cam diameter. This means that the roll cam which is being used corresponds in diameter with the pitch circle diameter which is determined by other parameters and is the largest that can be worked on the machine and by no means enlarges possibly occurring inexactnesses in the rolling motion of the roll cam, but are transferred corresponding with the diameter ratio only in a reduced manner onto the workpiece.

Gear-grinding machines, in which the roll-cam carriage is driven for movement back and forth transversely with respect to the roll-cam or workpiece axis, are known (German OS No. 24 59 033), however, in these machines it is necessary to provide for each pitch circle diameter of the gears which must be worked a separate roll cam of a suitable diameter.

The description introduction of German Pat. No. 721 899 mentions a rolling drive which is comparable with the subject matter of the invention, in which rolling drive the driven carriage is the roll-cam carriage and in which the pole point of the rocker arm and of the hinge point on the roll-cam carriage lie on the same side of the hinge point on the roll-cam carriage. The pole point of the rocker arm is arranged stationarily in this rolling drive. How the hinge points on the rocker arm are adjusted to different workpiece diameters can not be taken from this text area.

A further object of the invention is the provision of structure wherein the pole point and the hinge points, in particular the hinge point of the roll-cam carriage, do not hinder one another during a setting of the machine; thus the pole point and the hinge point of the roll-cam carriage can have the same distance from the hinge point of the roll-cam carriage.

A still further object of the invention is an advantageous arrangement of the pole points and the provision of an associated indicator in a manner which substantially further simplifies the setting of the machine.

A still further object of the invention is the provision of an advantageous arrangement of the hinge points on the two carriages, because tests have shown that the hinge points during a direct arrangement on the carriages require, because of the movement of the rocker arm, a shape of the carriages which is unfavorable with respect to manufacture.

A still further object of the invention is the provision of a simple possibility to feed the grinding disk to the workpiece flank which is to be worked or to move the grinding disk away from the flank. The provision of a split or divided adjusting carriage is of great importance because the feeding to or moving away movement is always referred to the pitch circle. It would also be concievable to produce this movement by extending or shortening of the first or the second guide rod. The expense which would be necessary for this would, however, be enormous, since the guide rods would move constantly with the roll-cam carriage back and forth.

BRIEF DESCRIPTION OF THE DRAWINGS

The invention will be described hereinafter with reference to one exemplary embodiment which is shown in FIGS. 1 to 4.

DETAILED DESCRIPTION

Figure 1:
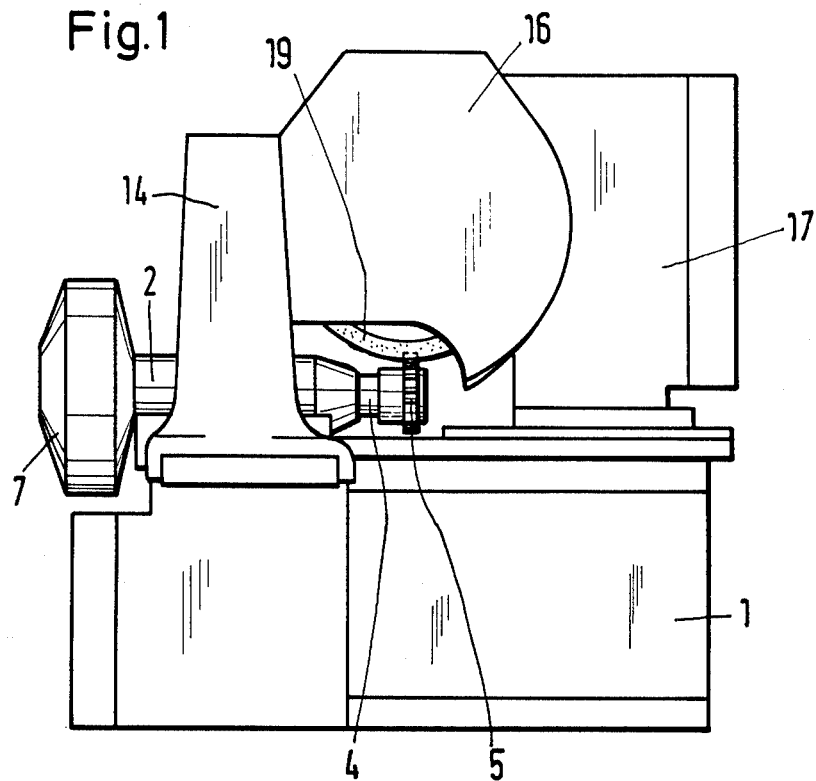
FIG. 1 illustrates a gear-grinding machine on which the invention is applied.
Figure 4:
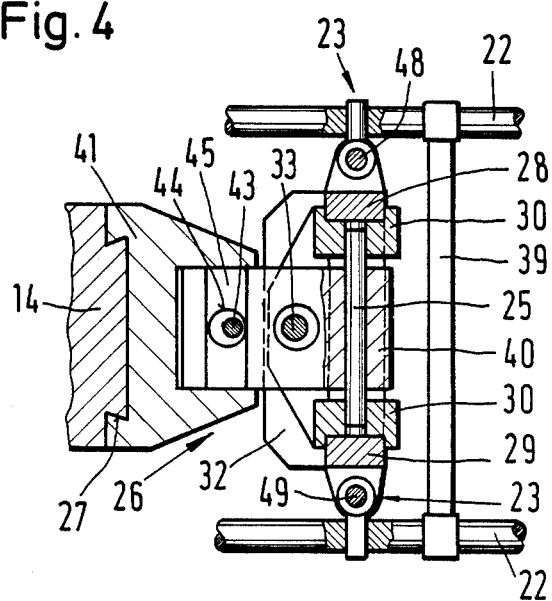
FIG. 4 illustrates a partial cross section taken along the line IV—IV of FIG. 2.
Figure 2:
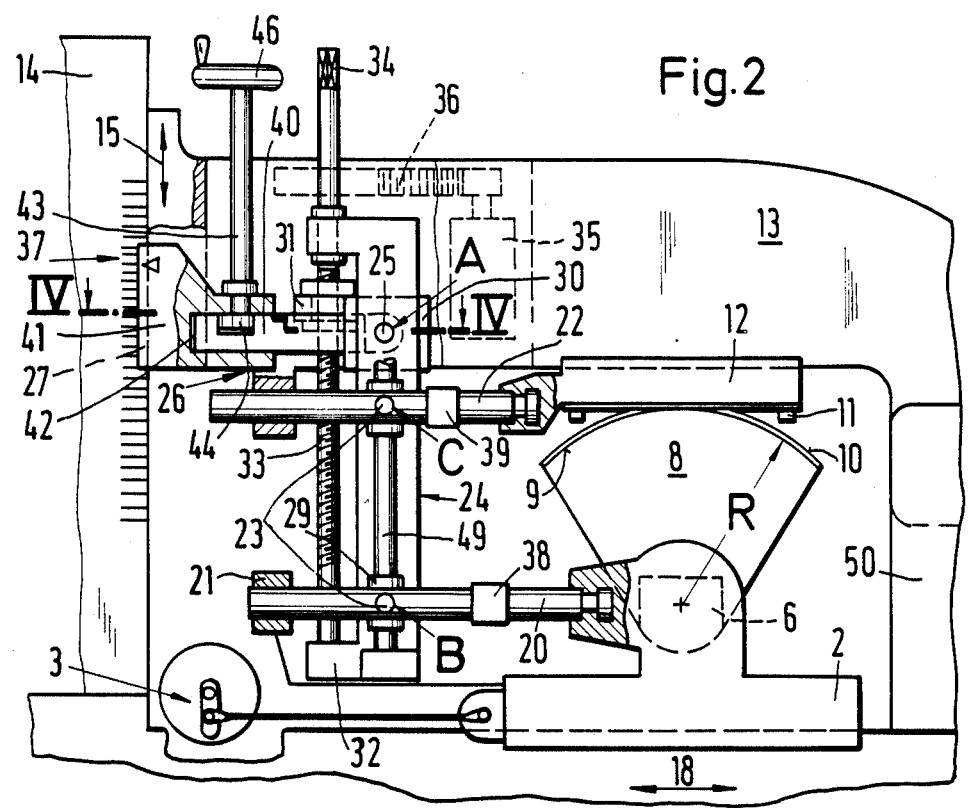
FIG. 2 illustrates a section of the machine according to FIG. 1, which section is not true to scale, namely, the indexing-control mechanism on the left side has been deleted so that the roll cam and the rocker arm can be seen.

A roll-cam carriage 2 shown in FIG. 1 is supported for movement back and forth perpendicularly with respect to the drawing plane and is driven in a suitable guideway provided on a machine base 1 of a gear grinding machine. The drive means for effecting the back and forth movement are known and are indicated in FIG. 2 by a simplified illustration of a crank gear 3. A known and therefore not illustrated in detail workpiece spindle 4 extends transversely with respect to the direction of movement of the roll-cam carriage 2. The workpiece spindle 4 is enveloped at its end remote from the workpiece 5 by a roll-cam sleeve 6. The workpiece spindle 4 is supported together with the roll-cam sleeve for transverse movement back and forth with respect to the workpiece spindle, however, their axes are not longitudinally parallel. Thus, the workpiece 5 undergoes exclusively a plunge feed in direction of the tooth depth relative to a grinding disk 19. The workpiece spindle 4 and roll-cam sleeve 6 are coupled at the end remote from the workpiece 5 to a conventional indexing-control mechanism 7, of which FIG. 1 only shows the housing. The roll-cam sleeve 6 and the workpiece spindle 4 are supported in the same bearings. At the end of the workpiece spindle remote from the indexing-control mechanism, there is clamped the workpiece 5, a gear or the like, for example a shaving gear or a master gear, which is to be ground very precisely. A roll cam 8 is clamped to the roll-cam sleeve 6, if desired, exchangeably and adjustably relative to the roll-cam sleeve. Roll bands 9, 10 are secured at their one ends to the roll cam 8 and at their other ends, in a suitable releasable manner by screws 11, to a roll-band carriage 12. The roll-band carriage 12 is supported for movement transversely with respect to the axis of the workpiece spindle in a suitable guideway, which is not illustrated in detail, on an arm 13. The arm 13 is guided for movement in the vertical direction (arrow 15) in a not illustrated guideway on a column 14 which is secured to the machine base 1. The arm 13 can be driven and clamped in place by not illustrated structure. The free end of the arm 13 is supported for adjustable movement elevationally and clampably on a bearing block which is also secured to the machine base 1. The bearing block is opposite the column 14 and is blocked from view by column 14 in FIG. 1.

The grinding disk 19, which for working of a workpiece tooth flank, is received in a tooth gap of the workpiece 5, is elevationally adjustable in a grinding-wheel spindle head 16 on a wheel stand 17 and is secured at an angle compared with the workpiece tooth for the purpose of adjusting the pressure angle. The wheel stand can be adjusted on the machine base 1 to the desired pitch angle of the workpiece teeth.

Two lower guide rods 20 are arranged on the roll-cam carriage 2, which guide rods lie in a horizontal plane and parallel to the direction of movement 18 of the roll-cam carriage 2. The two guide rods 20 can be connected by bars 38. One end of each of the guide rods 20 is received in and supported by the actual roll-cam carriage 2. The other end of each guide rod is received in and supported by an arm 21 which extends out from the rollcam carriage 2. Two upper guide rods 22 are secured to the roll-band carriage 12, which guide rods 22 are directed parallel to the lower guide rods 20. The upper guide rods 22 are connected by bars 39. The end of each guide rod remote from the roll-band carriage 12 is movably supported in the arm 13. The vertical distance BC between the upper guide rods 22 and the lower guide rods 20 corresponds exactly with the radius R of the roll cam. Each guide rod 20, 22 is connected by a joint 23 to a rocker arm 24 suspended by means of a pin 25 on an adjusting carriage 26. The pin 25 extends transversely to the guide rods 20, 22. The carriage 26 is movable up and down in a vertical guideway 27 on the column 14. The rocker arm 24 is a framelike part, between the end pieces 28, 29 of which there are arranged sliders 30 having structure for receiving the pin 25. The sliders 30 are elevationally movable by means of a spindle 33 which is rotatably supported in an upper frame part 31 and a lower frame part 32. For this the spindle 33 is provided at its upper end with a profile 34 for receiving a not illustrated handwheel or the like. In place of a manual operation, a motoric operation is also possible, for example through a stepping motor 25 and a belt drive 36. When the spindle 33 is turned, the pin 25 and thus the adjusting carriage 26 are moved upwardly or downwardly. The respective position of the pin 25 can be read on a scale 37 on the column 14.

Figure 3:
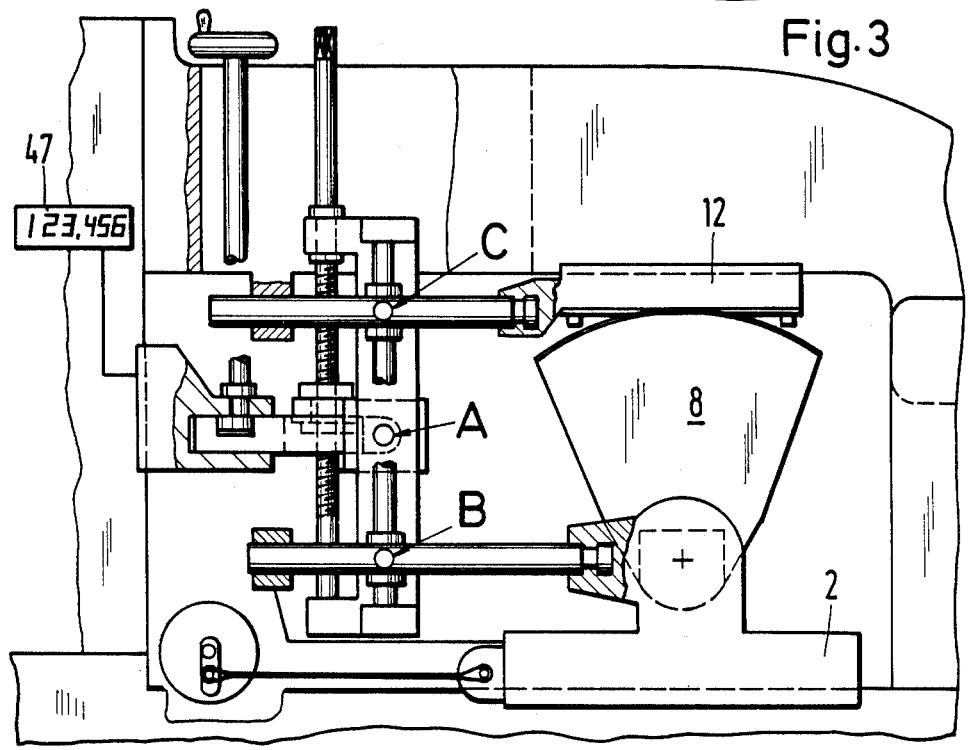
FIG. 3 illustrates the same section as FIG. 2, however, with a smaller workpiece.

The apparatus operates as follows. The pin 25, about which the rocker arm 24 pivots (pole point A) is adjusted in such a manner, that its vertical distance AB from the joints on the lower guide rods 20 (hinge point B) correspond with the pitch circle radius of the gear 5 which is to be worked. The scale 37 therefore has a graduation, which represents the pitch circle radius or the pitch circle diameter and in this manner permits a simple adjusting of the pole point A. If the roll-cam carriage 2 is moved back and forth in arrow direction 18 by the crank gear 3, then the lower guide rods 20 and thus the hinge point B also participate in this movement. With this the rocker arm 24 is forced to carry out a pendulum movement about the pole point A. The joints 23 on the upper guide rods 22 (hinge point C) also participate in this movement and thus causes through the guide rods 22 the roll-band carriage 12 to also move in direction of the arrow 18. With this an additional movement is superposed over the rotary movement of the roll cam 8 in order to compensate for the difference between the pitch circle diameter (this is 2·AB) and roll-cam diameter (this is 2·R or 2·BC). If a gear 5 is ground, the pitch circle diameter of which is larger than the roll-cam diameter, that is, the pole point A lies—as shown in FIG. 2—above the hinge point C, then the roll-band carriage 12 is moved in the same direction as the rollcam carriage 2. Thus the roll cam 8 carries out a larger rotary movement than in a pitch circle diameter which corresponds with its diameter. Whereas, if a gear 5 is ground, the pitch circle diameter of which is smaller than the roll-cam diameter, that is, the pole point A lies—as shown in FIG. 3—below the hinge point C, then the roll-band carriage 12 is moved in a direction opposite to the roll-cam carriage 2. Thus the roll cam 8 carries out a smaller rotary movement than in a pitch circle diameter which corresponds with its diameter. In the special case, where the pitch circle diameter of the gear 5 which is to be ground corresponds exactly with the roll-cam diameter, that is, where the pole point A is congruent with the hinge point C, no movement is transferred onto the roll-band carriage 12 and the rotary movement of the roll cam is not superposed by any other movement.

A condition for the functioning of the apparatus is that the hinge points B, C do not change their position relative to the guide rods 20, 22. They slide only relative to the rocker arm 24. For this purpose, sliding guides 48, 49 are mounted on the end pieces 28, 29 which sliding guides 48, 49 permit a relative movement of the joints 23 along the line A–B. Since these sliding guides 48, 49 lie in other planes than the sliders 30, the adjusting of the pole point A can occur totally independently from the hinge point C. The distance BC or AB is the largest at each return point of the roll-cam carriage 2 at the end of its back and forth movement.

Even though in the exemplary embodiment according to FIG. 2 AB>BC, the arrangement according to FIG. 3 with AB≦BC is more advantageous, because then possibly occurring enlarged inexactnesses in the rolling movement of the roll cam cannot be transferred onto the workpiece. One will therefore, if possible, work with a roll cam, the diameter of which corresponds with the largest workpiece pitch-circle diameter which is able to be ground on the machine. If in special cases roll cams with another diameter of another form (eccentric roll cam) are used, then the changing over of the machine does not create any special problems, since the lower guide rods 20 are carried only by the roll-cam carriage 2 independent from the roll cam 8, because the upper guide rods 22 are supported in the arm 13, which must at any rate be adjusted in order to adjust the position of the roll-cam carriage 12 with the roll-cam diameter.

It must be possible in practice to manually feed during the back and forth movement of the roll-cam carriage 2 the grinding disk 19 toward the workpiece tooth flank or to remove same from the workpiece tooth flank. A possibility for this is to change the position of the pole point A in the horizontal direction which, in th exemplary embodiment, is achieved by a split or divided adjusting carriage 26. A part 40 which receives the pole point A is supported for movement in the horizontal direction of the arrow 18 in a recess 42 of a part 41 movably received in the vertical guideway 27. A vertical spindle 43 is supported in the part 41, on which spindle is mounted an eccentric 44 which engages play-free or without clearance a wall of a groove 45 of the part 40. The spindle 43 is provided with a handwheel 46. By rotating the spindle 43 and thus the eccentric 44, the part 40, and thus also the pole point A, is moved like in FIG. 2 to the right or left. All devices which are needed for adjusting the part 40 operate self-lockingly, however, it is also possible to provide known clamping devices. However, such clamping devices require a not insignificant structural and operational (maintenance) expense. Further, an influence on the only very small adjusting path cannot be precluded.

The invention is not to be limited to the described exemplary embodiments. Other embodiments are also possible. For example, it is possible to provide instead of the scale 37 on the column 14 a digital indicator 47 (FIG. 3), or the joints 23 slide instead of on the rodlike sliding guides 48, 49 on other guideways or—like the sliders 30—directly on the end pieces 28, 29. Furthermore, a modification is possible such that in place of the guide rods 20, 22, which are arranged in pairs only one upper and lower guide rod is provided.

The embodiments of the invention in which an exclusive property or privilege is claimed are defined as follows:

1. A rolling drive of a gear-grinding machine for use in machining of tooth flanks on straight or helically toothed spur gears, such that a rotation portion of a rolling movement is effected by roll bands secured at one end to a roll-band carriage which is movable transversely to a workpiece axis in a machine frame and at the other end to a roll cam, said roll bands rolling onto and off from said roll cam, said roll cam and said workpiece being supported on a roll-cam carriage which is movable parallel to said roll-band carriage, and said roll-band carriage and said roll-cam carriage, of which one is driven back and forth, are connected through joints to a rocker arm hingedly supported on a pole point on said machine frame, which pole point is adjustable corresponding with a workpiece diameter, and transfers the movement of a driven one of said carriages onto the other one, the improvement comprising wherein said driven carriage is said roll-cam carriage and wherein a pole point (A) of said rocker arm and a hinge point (C) on said roll-band carriage lie on one side of a hinge point (B) on said roll-cam carriage such that between the distance AB of said pole point (A) of said rocker arm from said hinge point (B) of said roll-cam carriage on said rocker arm and the distance BC of said hinge point (B) from said hinge point (C) of said roll-band carriage on said rocker arm, there exists the relationship AB=BC.

2. A rolling drive of a gear-grinding machine for use in machining of the toothed flanks on straight or helically toothed spur gears, such that a rotation portion of a rolling movement is effected by roll bands secured at one end to a roll-band carriage which is movable transversely to a workpiece axis in a machine frame and at the other end to a roll cam, said roll bands rolling onto and off from said roll cam, said roll cam and said workpiece being supported on a roll-cam carriage which is movable parallel to said roll-band carriage, and said roll-band carriage and said roll-cam carriage, of which one is driven back and forth, are connected through joints to a rocker arm hingedly supported on a pole point on said machine frame, which pole point is adjustable corresponding with a workpiece diameter, and transfers the movement of a driven one of said carriages onto the other one, the improvement comprising wherein said driven carriage is said roll-cam carriage and wherein a pole point (A) of said rocker arm and a pole point (C) on said roll-band carriage lie on one side of a hinge point (B) on said roll-cam carraige such that the distance AB between said pole point (A) of said rocker arm and said hinge point (B) of said roll-cam carriage on said rocker arm is smaller than or at most the same size as the distance BC between said hinge points (B,C) of said roll-cam carriage and of said roll-band carriage on said rocker arm.

3. A rolling drive according to claim 1 or 2, wherein said pole point (A) of said rocker arm on said machine frame at one end and said hinge points (B,C) on the two carriages at the other end lie in two planes which are parallel to one another and through which extends perpendicularly the workpiece axis.

4. A rolling drive according to claim 1 or 2, wherein said pole point (A) of said rocker arm lies in an adjusting carriage which is adjustable in vertical direction and is securable to said machine frame.

5. A rolling drive according to claim 4, wherein an indicator is provided which indicates the distance AB which corresponds with the half pitch circle diameter of said workpiece which is to be worked.

6. A rolling drive according to claim 4, wherein an indicator is provided which indicates the pitch circle diameter of said workpiece which is to be worked, which pitch circle diameter corresponds with twice the distance AB.

7. A rolling drive according to claim 1 or 2, wherein said hinge point (C) which is associated with said roll-band carriage is arranged on at least on upper guide rod rigidly connected to said roll-band carriage and said hinge point (B) which is associated with said roll-cam carriage is arranged on at least one lower guide rod rigidly connected to said roll-cam carriage, said upper and lower guide rods extending parallel to the direction of movement of the two carriages.

8. A rolling drive according to claim 4, wherein a two-part design of said adjusting carriage is provided such that a first part which contains said pole point (A) is movable parallel to the direction of movement of the two carriages relative to a second part which cooperates with said machine frame by means of an eccentric which can be rotated from external means and which cooperates with a corresponding groove on said first part.

* * * * *